July 20, 1948. W. O. JONES 2,445,672
HEART TESTING MACHINE OF A BEAM REFLECTOR TYPE
Filed March 10, 1947 2 Sheets-Sheet 1
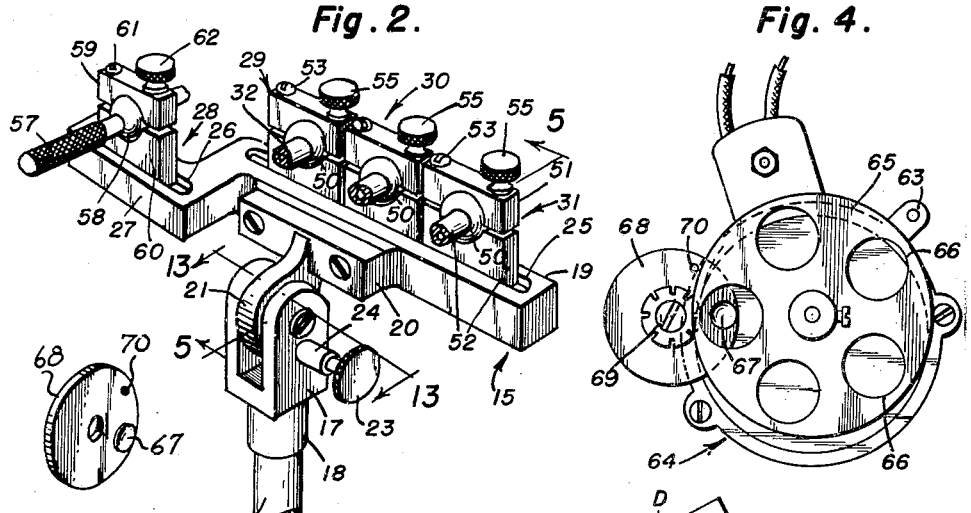
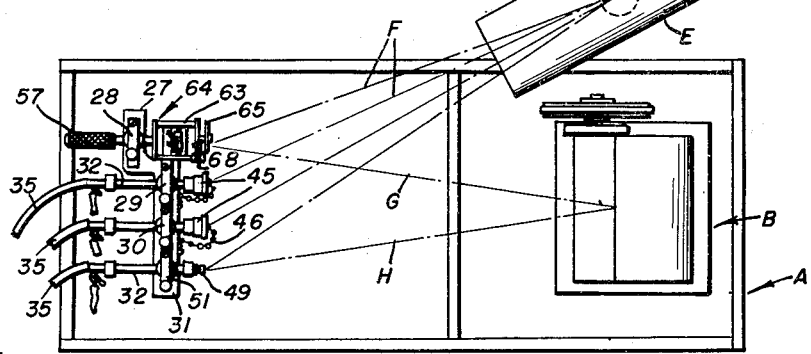
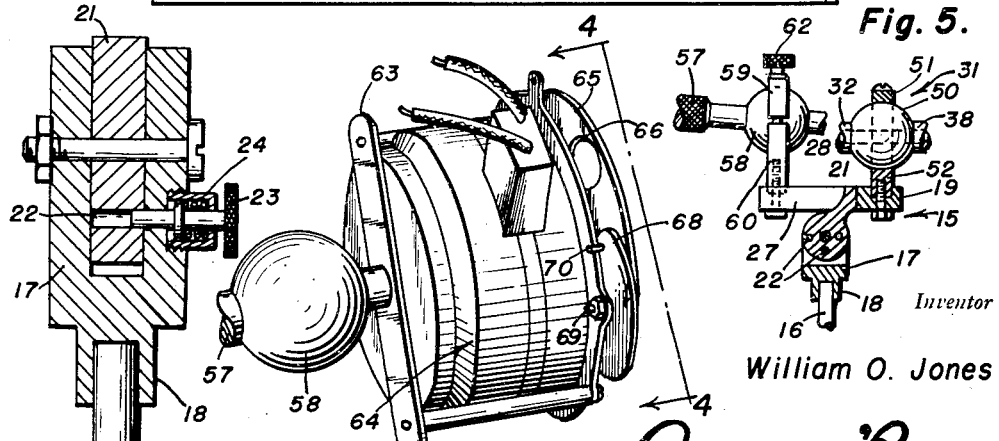
Inventor
William O. Jones July 20, 1948.  W. O. JONES  2,445,672
HEART TESTING MACHINE OF A BEAM REFLECTOR TYPE
Filed March 10, 1947  2 Sheets-Sheet 2
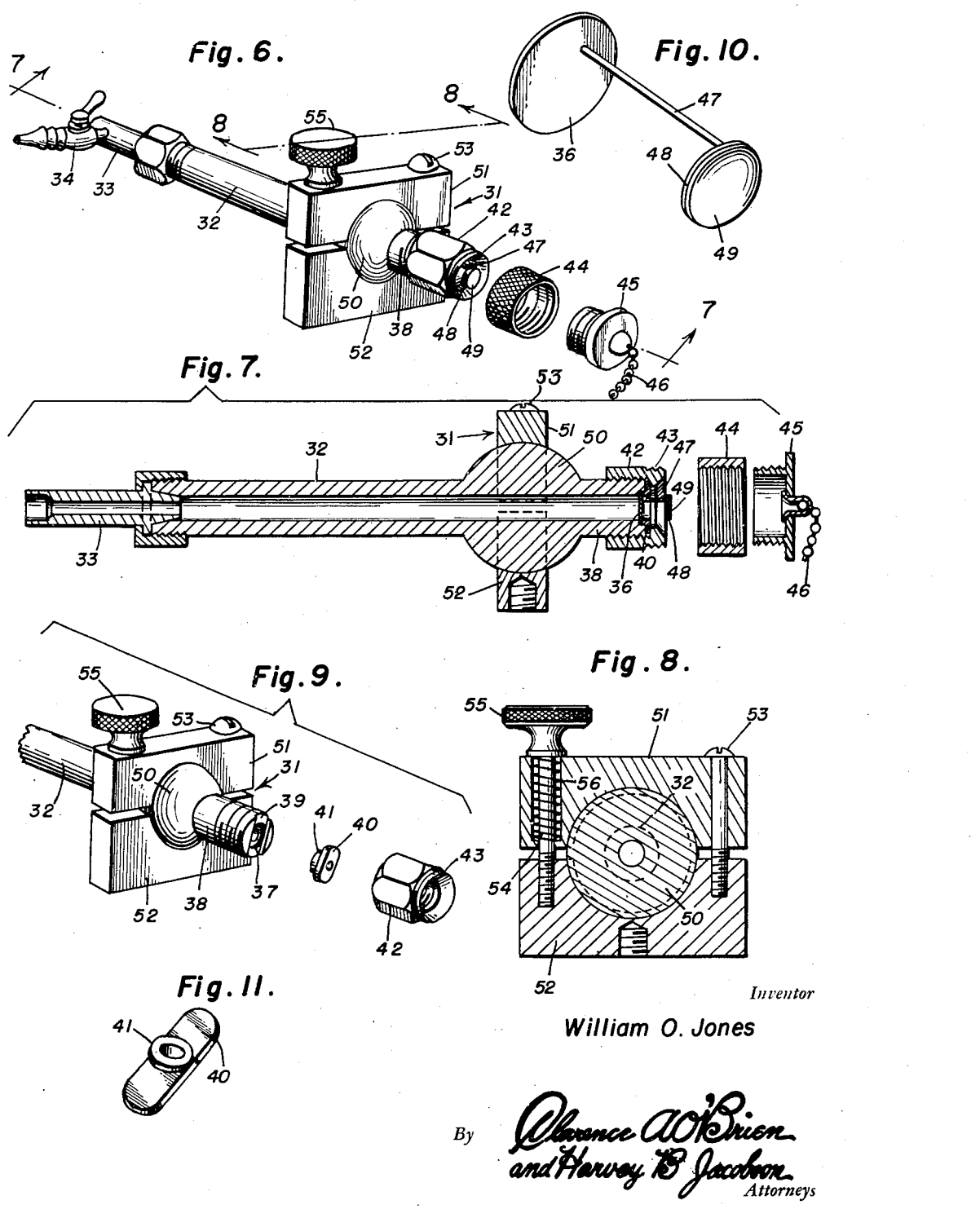
Inventor
William O. Jones
By *Clarence A. O'Brien and Harvey B. Jacobson*
Attorneys Patented July 20, 1948

2,445,672

UNITED STATES PATENT OFFICE 2,445,672

HEART TESTING MACHINE OF A BEAM REFLECTOR TYPE

William O. Jones, Baltimore, Md.

Application March 10, 1947, Serial No. 733,660

16 Claims. (Cl. 128—2.05)

This invention relates to certain structural and functional improvements on a heart checking and testing machine of a type which relies on arterial pulsations as ways and means of ascertaining and determining circulatory conditions of the human body, whereby, as a result thereof, a physician may arrive at a diagnosis on which to predicate decisions for patient treatment purposes.

The machine in question involves the use of a movable recording film in an appropriate camera. A source of light is provided and the rays of light are projected therefrom and against small vibratory mirrors, the latter serving to reflect and focus return beams onto said film. The mirrors, in turn, are responsive to intermittent pulsations from the source and hence as the film travels, wavy lines are photographed and recorded thereon and the results are checked by the physician in a now well known manner to formulate diagnoses for guidance and decision establishing purposes.

In the machine to which I refer, each beam reflecting mirror is mounted on a small and highly sensitive diaphragm, this on a liquid surge tube and the latter is connected up with a flexible liquid conduit whose impulse pick up end is suitably contacted with the patient at selected points. Thus, the arterial pulsations act on the liquid and the latter impinges against the flexible diaphragm which translates the impulses to the mirror with the accomplishment that the reflected light beam depicts the tell-tale results on the stated moving film. In competitive machines presently used by others, the diaphragm, a "tissue-paper-thick" sensitive disk, is extremely fragile and is clamped removably in place on a surge tube through the instrumentality of a screw-cap and when the latter is screwed "home" the outer marginal edge of said diaphragm is distorted, and, naturally, such distortion interferes with accuracy of the beam projection and filming results. Therefore, one object of the present invention is to mount and clamp the diaphragm securely and to, at the same time, overcome and avoid distortion of the latter, whereby to permit it to serve its intended purposes with precision and assured accuracy.

Practice has shown that the part which carries the diaphragm and mirror assembly, that is, the aforementioned surge tube, must be adjustably mounted so that by angling the tube the mirror thereon may thus be aimed at the film in a manner to properly focus the reflected beam on said film. In testing and filming machines of the types with which I am familiar, the tube, although adjustably perched for focusing, is not susceptible of ready and reliable handling. So, and in consequence thereof, I have evolved and produced a more efficient tube mount which, through the medium of a ball and socket construction enables the user to attain desired results with expediency and satisfaction.

In machines of the type under advisement two parallel, or substantially so, lines are photographed on the traveling film of the camera, one line being of a wavy character and serving to denote fluctuations of the variable "pulsations" filmed. The second line denotes measurements in time. Therefore, in the battery of reflecting mirrors, one mirror is used in association with a motor driven shutter, said shutter being operated and rotated at a predetermined speed and serving to provide the desired timing results on the stated film. In connection with the timer means it is an object of the present invention to provide an adjustable handle equipped motor included unit carrying the shutter, said unit being adjustably mounted for aiming and focusing in relation to the film and there being a special disk interposed between the motor and shutter, this having a boss on which exchangeable reflectors or mirrors may be mounted. Since the mirrors have to be replaced frequently, this improvement permits access to be had, whereby to readily attain desired results.

Another object of the invention is to provide an adjustable head structure which is mounted on a stand carried by the main frame of the machine, the stand being perpendicularly disposed and the head being vertically adjustable on a horizonal axis to permit the various mirrors and their mounts, as a unitary assemblage, to be tilted up and down for better focusing accomplishments.

A further object is predicated on the adoption and use of a battery of mirrors, including the timing mirror, wherein sectional block mounts are provided, these serving to support the aforementioned mirror equipped tubes for aiming, angling and precision focusing.

Other objects and advantages of the invention will become more readily apparent from the following description and the accompanying illustrative drawings.

In the drawings, wherein like numerals are employed to designate like parts throughout the views:

Figure 1 is a top plan view, of a diagrammatic nature, this showing the general arrangement, a portable frame, camera, source of light, and multiple reflecting mirrors equipped unit.

Figure 2 is a fragmentary perspective view showing the aforementioned stand, adjustable head and multiple mirrors equipped device or unit mounted on said head.

Figure 3 is a fragmenary perspective view showing the motor and mirror included timer unit and particularly the accessible swingably mounted disk or base plate for the complemental mirror.

Figure 4 is a front view of Figure 3 observing same from right to left, that is on the plane of the line 4—4 of Figure 3 looking in the direction of the arrows.

Figure 5 is a sectional and elevational view, on a reduced scale, taken approximately on the plane of the line 5—5 of Figure 2, looking in the direction of the arrows.

Figure 6 is a perspective view of one of the mirror units, the type used for reflecting a beam on the film in a manner to report findings in relation to arterial pulsations.

Figure 7 is a central longitudinal sectional view taken on the plane of the line 7—7 of Figure 6, looking in the direction of the arrows.

Figure 8 is a section at right angles to Figures 6 and 7, the same being taken on the cross section line 8—8 of Figure 6 looking in the direction of the arrows.

Figure 9 is a fragmentary perspective view based on Figure 6 and showing the assembling and clamping means for the flexible diaphragm and companion mirror carried by said diaphragm.

Figure 10 is a perspective view of the diaphragm, mirror and support for the mirror, this being on a scale sufficiently large to emphasize the details of construction.

Figure 11 is a perspective view of the diaphragm clamping cleat.

Figure 12 is a perspective view of the accessible mirror supporting member of the timer seen in Figures 3 and 4.

Figure 13 is an enlarged fragmentary sectional view taken on the plane of the line 13—13 of Figure 2, looking in the direction of the arrows.

Reference is now had to the drawings by distinguishing reference numerals. Referring first to the diagrammatic illustration in Figure 1, A designates an openwork portable frame structure. This is a frame construction used in a machine which is currently on the market and is, therefore, not illustrated in great detail. Inasmuch as I do not claim parts of the machine generally speaking, I have merely shown the frame structure in top plan. This figure is sufficient to bring out the broad arrangement of major facilities, one of which includes a movable film and result recording camera B. The latter is also a type of camera already in use on machines of this character and is not detailed. Reference character C designates the source of light which includes, among other parts (not shown) an incandescent bulb D and a projector shell E therefor. The source of light is adjacent the camera and the bulb projects light rays F, in the manner illustrated. The reflected beams focused onto the film (not detailed) of the camera are denoted by the characters G and H respectively. G is the timing beam and H is the tell-tale beam which produces a wavy line on the film for recording arterial pulsations. Repeating, this procedure, using (1) a source of light, (2) a camera and (3) projecting and reflecting beams on a film in said camera is well known. It follows that the specific improvements herein shown are at the left in Figure 1 and detailed to the best advantage in Figures 2, 3, 4, 6, 9 and 10.

Reference is had now to Figure 2 wherein the "battery" of mirrors equipped are means shown supported on a head structure which is generally denoted by the numeral 15. While this head structure may be supported from any suitable framework, in any other fashion, I have found it expedient and practical to employ a stand which is attached to the framework. The stand includes an upright or post 16 and the entire head structure is adjustably mounted atop same. A yoke 17, having a socket 18, is mounted on the upper end of the post and this arrangement serves to accommodate an L-shaped block 19. The block is provided with a bracket 20 which in turn has a disk-like lug 21 pivotally mounted between the arms of the yoke. The lug 21 is provided with a series of keeper holes 22 (see Figures 5 and 13), said keeper holes serving to accommodate the hand operated latch pin 23. The latch pin is mounted in a spring contained casing 24 and thus the head structure 15 may be vertically tilted upon a horizontal axis.

Four separate reflector units constitute the aforementioned battery of units and these are mounted in grooves 25 and 26 provided therefor in the main and lateral branches 27 of the L-shaped head. The timer unit is differentiated by the reference numeral 28 and the three complemental but independent arterial pulsating beaming units are denoted by the numerals 29, 30 and 31 respectively. Each of the units 29, 30 and 31 is the same in construction and the description of one will suffice for all. Reference is made therefore to Figures 6, 7, 8, 10 and 11. Each unit includes a hollow liquid containing handle forming or so-called surge tube 32. A valve fitting 33, including a suitable valve 34 is attached to the left hand end of the tube. The part 33 serves to accommodate a hose or flexible pipe 35 (at the left in Figure 1) which is provided on its body contact end (not shown) with means for contact with a predetermined part of the body of the patient. This contact means and hose arrangement is old and well known to those familiar with these types of machines. In practice each tube 32 and its connected line is filled with an appropriate fluid which is activated by arterial pulsations from the body of the patient and the fluid acts upon a diaphragm (a highly sensitive tissue-paper-weight) element denoted in Figure 10 by the numeral 36. The diaphragm is seated in a recess provided therefor as at 37 in Figure 9. The recess is formed in the threaded neck end 38 of the tube. This end is improved here by providing a special notch 39 to receive block-like cleat 40 which is centrally apertured and provided with a clamping boss 41 which fits into the recess 37 and clamps the diaphragm 36 in its seat. Heretofore the mounting and clamping of the diaphragm has been such that a ruinous torsional twist is exerted on the rim or perimeter of the diaphragm and the latter is thus distorted and causes leakage of the fluid and thus fails to report accurate findings from the body of the patient. In my improved arrangement the diaphragm is clamped in place by direct end thrust pressure and this is obtained by use of the clamping and assembling nut 42 which is threaded on the neck to press and hold the cleat 40 securely in place. Incidentally, the nut is provided with a screw threaded neck 43 to accommodate a knurled thimble or collar 44. The collar serves to accommodate a closing cap 45 which is anchored in place by a chain or the like 46.

The diaphragm 36 carries an eccentrically mounted rod 47 having a disk-like base 48 on its outer end. The base serves as a foundation for the concaved reflecting mirror 49. These mirrors have to be replaced frequently for effective results and are therefore independent units and are mounted in the manner shown. The idea of the diaphragm carrying a rod to the base to mount a mirror is not new. However the idea of eccentrically mounting the rod 47 in relation to the center of the diaphragm is believed to be novel and experience has shown that thus arranged off center, the mirror reports, without fluctuations, the final recording results.

The tube is provided here with an improved ball jointing element 50 which is mounted in socket means provided therefor in companion blocks 51 and 52.

As shown to advantage in Figure 8 the blocks are bolted together as at 53 and a thumb screw 54 is provided on an opposite side. This thumb screw has a suitable finger grip 55 and its shank passes through a socket having a cushioning spring 56 therein. This provides an aptly sensitive friction grip for the ball jointing member and permits the tube 32, which serves as a handle, to be angled on a universal joint, and aimed and properly focused to bring the reflecting mirror 49 into accurately reflective relationship to the camera film (not shown). The adjustability of the head 15, with the entire battery of units thereon, and the individual regulation of the units 29, 30 and 31 provide an adaptable structure which insures effective and highly efficient results. Compared to structures of this type currently in use, many advantages attend the structure herein covered, best illustrated perhaps in Figures 6 and 7. The closing caps 45 are used, as desired, since in practice only one of the three reflectors 29, 30 and 31 is employed at a time. Thus, it is advisable, if not necessary, to cover the reflectors which are not in use at the same time.

Referring now to the motor driven timer unit 28, at the left in Figure 2, this comprises a handgrip or handle 57 provided with a ball jointing element 58 mounted between blocks 59 and 60 assembled and adjusted by the bolt 61 and hand screw 62 as already described. As brought out in Figure 3 the handle is connected to a harness 63 which supports a suitable motor 64, said motor driving a shaft carrying a shutter disk 65. The disk is provided with circumferentially spaced equidistant apertures 66 and these apertures intermittently cover and uncover a reflecting mirror (see Figure 12) 67 mounted on an eccentric boss carried by a disk-like plate 68. This plate is mounted between the fore end of the motor and the shutter, being hingedly attached as at 69 in order that it may be swung out and clear of the marginal edge of the shutter to permit the mirror to be removed and replaced as conditions require. A stop pin 70 is provided on the rear side of the disk to engage the motor and to retain said disk in a set or properly functioning position.

In operation, it is obvious that after the parts are properly adjusted by aiming and focusing, when the light D is turned on and its light rays F focused on the mirrors, the mirrors in turn serve to return or focus the beams G and H on the moving film of the camera B. As brought out diagrammatically in Figure 1 two of the devices 29 and 30 are capped and closed and the remaining mirror on the unit 31 is then in use. This mirror unit is used in conjunction with the timer unit 28 at the left and the two beams G and H act to transmit the required beams to the focal points on the traveling film of the camera. I shall not attempt to explain the theory of the machine for it is a type well known in the profession to physicians who specialize in heart testing by way of photographic film recordation results. In fact, the improvements herein are primarily, as before stated, in the details of construction, essentially of the devices in the head structure 15. The head structure itself is new and novel, it is believed, the ball and socket mounts are new, the construction of the timer unit 28 is believed to be new. The adjustable plate 68 in Figure 12 and mount for the mirror is an improvement in this line of endeavor. The unit shown in Figure 10 is believed to be distinct. Most important is the direct thrust assembling and clamping means for the diaphragm shown in Figure 9.

Changes in shape, size, materials and rearrangement of details and parts may be resorted to in actual practice, so long as they do not depart from the spirit of the invention or the scope of the appended claims, as is well understood.

I claim:

1. In a structure of the class described, a mount including a pair of adjustably and separably connected blocks, said blocks embodying socket means, a tube having a ball jointing element mounted in said socket means, one end of the tube embodying a hand-grip, the opposite end of the tube being formed with a screw threaded neck, said neck having a recess, a flexible diaphragm mounted in said recess, and means for holding the diaphragm in place in said recess.

2. In a structure of the class described, a mount including a pair of adjustably and separately connected blocks, said blocks embodying socket means, a tube having a ball jointing element mounted in said socket means, one end of the tube embodying a hand grip, the opposite end of the tube being formed with a screw threaded neck, said neck having a recess, a flexible diaphragm mounted in said recess, means for holding the diaphragm in place in said recess, said diaphragm having an outstanding arm terminating in a head, and a mirror removably mounted on said head.

3. In a structure of the class described, a mount including a pair of adjustably and separably connected blocks, said blocks embodying socket means, a tube having a ball jointing element mounted in said socket means, one end of the tube embodying a hand-grip, the opposite end of the tube being formed with a screw threaded neck, said neck having a recess, a flexible diaphragm mounted in said recess, means for holding the diaphragm in place in said recess, said diaphragm having an outstanding arm terminating in a head, a mirror removably mounted on said head, and said arm being eccentrically located in respect to the axial center of said diaphragm.

4. As a new article of manufacture and as a component part of an assemblage of the class described, a highly flexible diaphragm, an arm attached to one side of the diaphragm and located eccentrically in respect to the axial center of the diaphragm, a head on the outer end of the arm, said head being eccentric to the arm, and a mirror removably mounted on said head.

5. In a structure of the class described, a mount, a tube adjustably secured on said mount, said tube having a recess in its outer end for reception of a diaphragm, said tube further having a notch in alignment with said recess, a centrally apertured cleat fitted in said notch and having an annular boss projecting into the recess.

6. In a structure of the class described, a mount, a tube adjustably secured on said mount, said tube having a recess in its outer end for reception of a diaphragm, said tube further having a notch in alignment with said recess, a centrally apertured cleat fitted in said notch and having an annular boss projecting into the recess, the diahphragm in said recess held in same by said boss, said diaphragm having an outstanding reach and director arm, a mirror mounted on the outer end of said arm, and a screw threaded fitting threaded on said neck and serving to clamp said cleat in place.

7. The structure specified in claim 6, said screw-threaded fitting being adapted to accommodate a closing cap, and a closing cap removably mounted on said fitting.

8. In a structure of the class described, a mount comprising a pair of opposed separably and adjustably connected blocks, inner coacting portions of said blocks being notched and formed into socket means, a tube having a ball jointing element mounted in said socket means, said tube being adapted for connection with a liquid supply at its intake end, the opposite end of the tube being formed into a neck, said neck being centrally recessed and also centrally notched and said notch being in communication with the recess, a cleat removably inserted and fitted in said notch, said cleat having a boss and said boss fitting into said recess, and a screw threaded fitting on said neck serving to hold said cleat in place.

9. In a heart-testing machine of a beam-reflector type, a frame, a film-included camera on the frame, a source of light associated with the frame and camera, a head structure vertically adjustable on a horizontal pivot supported from said frame, a block section mounted on said head structure, a second and complemental block section adjustably connected with the first-named section, spring cushioning and tensioning means cooperable with said block sections, the latter being constructed to provide a socket, a surge tube having a ball jointing element intermediate its ends mounted for operation in said socket, one end of the surge tube being adapted to accommodate a fluid delivery hose, said one end being provided with a hand-grip, a fluid vibrated diaphragm mounted in the opposite end of said tube, and a reflecting mirror carried by said diaphragm.

10. The structure specified in claim 9, together with a closing cap to enclose and conceal the mirror when the latter is not in use.

11. In a structure of the class described, a mount including a pair of adjustably and separably connected blocks, said blocks embodying socket means, a surge tube having a ball jointing element mounted in said socket means, one end of said tube embodying a hand-grip, the opposite end of the tube being provided with a screw-threaded neck, said neck having a recess to accommodate a diaphragm, a tissue-paper weight flexible diaphragm removably mounted in said recess, end thrust and clamping means removably mounted on said screw-threaded neck and serving, by axial pressure, to maintain said diaphragm accurately in place in said recess, and a mirror carried by said diaphragm.

12. In a machine of the class described, a frame, a head structure adjustably mounted on said frame, a mount on said head structure including a socket, a handle having a ball jointing element removably and universally mounted in said mount, an electric motor mounted axially on one end of said handle, a shutter carried by the shaft of the motor, said shutter being spaced from said motor, an adapter plate swingably mounted on the motor and operable in the space between the motor and shutter, and a mirror removably and eccentrically mounted on said adapter plate.

13. As a new article of manufacture and as a component part of a heart-testing machine of the beam-reflector type herein shown and described, a rectilinearly straight handle provided intermediate its ends with a ball jointing element, an electric motor including a shaft in axial alignment with said handle, means for harnessing the motor on the outer end of said handle, a shutter mounted on the motor shaft and in spaced parallelism to the outer face of the motor, an adapter disk pivotally mounted on the forward marginal portion of the motor and situated in the space between the motor and shutter and swingable to a point outwardly beyond outer marginal portions of said motor and shutter, and also movable inwardly to a normally usable position between the motor and shutter, and a mirror removably and eccentrically mounted on said adapter disk and adapted to be lined up with the openings in said shutter, in the manner and for the purposes described.

14. In a heart-testing and photographic film recording machine of the class shown and described, a mobile supporting frame, a camera mounted on said frame, a source of artificial light associated with said frame and located adjacent the camera and adapted to project light rays in a direction away from the camera, a vertical post fixedly mounted on said frame, a horizontally elongated head structure tiltably mounted, on a horizontal axis, atop said post and swingable from a normal elevated position parallel to the frame through approximately ninety degrees to a lowered position at right angles to said frame, a light ray reflecting mirror mounted on said head structure and adjustable in relation to the head structure and also said camera and source of light, a motor-driven shutter also mounted on said head structure and aligned with said mirror and adjustable in unison with the mirror, a surge tube, independent of said mirror and shutter, means adjustably mounting said surge tube on said head structure for adjustment in relation to the head structure, said mirror, source of light and camera, and a second mirror mounted on and adjustable in unison with said surge tube.

15. In a heart-testing and photographic film recording machine of the class shown and described, a mobile supporting frame, a camera mounted on said frame, a source of artificial light associated with said frame and located adjacent the camera and adapted to project light rays in a direction from the camera, a vertical post fixedly mounted on said frame, a horizontally elongated head structure tiltably mounted on a horizontal axis atop said post and swingable from a normal elevated position parallel to the frame through approximately ninety degrees to a lowered position at right angles to said frame, a reflecting mirror adjustably mounted on said head structure and adjustable in relation to the head structure, said camera and source of light, a motor-driven shutter also mounted on said head structure and aligned with said mirror and simultaneously adjustable with the mirror, a surge tube independent of said mirror and shutter, a ball and socket joint connecting said surge tube with said head structure, one end of said surge tube being fashioned into a conveniently usable handle, and a second mirror mounted on and adjustable in unison with said surge tube.

16. In a heart-testing and photographic film recording machine of the class shown and described, a mobile supporting frame, a film-included camera mounted on said frame, a source of artificial light associated with said frame and located adjacent the camera and adapted to project light rays in a direction from the camera, a vertical post fixedly mounted on said frame, a horizontally elongated head structure tiltably mounted on a horizontal axis atop said post and swingable from a normal elevated position parallel to the frame and through approximately ninety degrees to a lowered position at right angles to said frame, a reflecting mirror adjustably mounted on said head structure and adjustable in relation to the head structure and also said camera and source of light, a motor-driven shutter also mounted on said head structure and aligned with said mirror and simultaneously adjustable with the mirror, a surge tube independent of said mirror and shutter, a ball and socket joint connecting said surge tube with said head structure, one end of said surge tube being fashioned into a conveniently usable handle, and a second mirror mounted on and adjustable in unison with said surge tube, said second-named mirror being on the end of the surge tube opposite to the handle and said mirror being detachably mounted for ready availability and replacement purposes.

WILLIAM O. JONES.

REFERENCES CITED

The following references are of record in the file of this patent:

UNITED STATES PATENTS

| Number | Name | Date |
|---|---|---|
| 575,202 | Bedell | Jan. 12, 1897 |
| 1,606,411 | Goble | Nov. 9, 1926 |
| 1,794,685 | Hayman et al. | Mar. 3, 1931 |

FOREIGN PATENTS

| Number | Country | Date |
|---|---|---|
| 675,233 | Germany | May 3, 1939 |